US00RE38413E

(19) United States
(12) Reissued Patent
Sugimoto et al.

(10) Patent Number: US RE38,413 E
(45) Date of Reissued Patent: Feb. 3, 2004

(54) PURE RED COLOR DETECTION CIRCUIT AND COLOR COMPENSATION CIRCUIT USING THE SAME

(75) Inventors: Hiroko Sugimoto, Osaka (JP); Atsuhisa Kageyama, Osaka (JP); Masahiro Takeshima, Osaka (JP); Minoru Kawabata, Osaka (JP)

(73) Assignee: Matsushita Electric Industrial Co. Ltd., Osaka (JP)

(21) Appl. No.: 09/727,884

(22) Filed: Dec. 1, 2000

Related U.S. Patent Documents

Reissue of:
(64) Patent No.: 6,064,447
Issued: May 16, 2000
Appl. No.: 09/035,684
Filed: Mar. 5, 1998

(30) Foreign Application Priority Data

Mar. 6, 1997 (JP) ..... 9-051339

(51) Int. Cl.[7] ..... H04N 9/64
(52) U.S. Cl. ..... 348/649; 348/650; 348/679; 348/690; 348/703; 382/162; 382/167
(58) Field of Search ..... 348/649, 650, 348/679, 690, 703, 645, 646, 647, 648, 653, 654, 468, 630; 382/162, 167, 274; 358/518, 532, 448, 464

(56) References Cited

U.S. PATENT DOCUMENTS

| | | | | | |
|---|---|---|---|---|---|
| 4,847,677 | A | * | 7/1989 | Music | 358/13 |
| 4,953,011 | A | * | 8/1990 | Mori | 348/30 |
| 5,134,465 | A | * | 7/1992 | Ohki et al. | 358/27 |
| 5,294,974 | A | * | 3/1994 | Naimpally et al. | 348/395 |
| 5,353,058 | A | * | 10/1994 | Takei | 348/363 |
| 5,418,575 | A | * | 5/1995 | Kaneko et al. | 348/645 |
| 5,428,385 | A | * | 6/1995 | Sakata | 348/82 |
| 5,555,022 | A | * | 9/1996 | Haruki et al. | 348/223 |
| 5,621,827 | A | * | 4/1997 | Uchiyama | 382/307 |
| 5,663,769 | A | * | 9/1997 | Hanai | 348/630 |
| 5,680,324 | A | * | 10/1997 | Schweitzer | 364/514 |
| 5,835,641 | A | * | 11/1998 | Sotoda | 348/169 |
| 5,838,465 | A | * | 11/1998 | Satou | 358/520 |
| 5,850,473 | A | * | 12/1998 | Andersson | 382/165 |
| 5,910,823 | A | * | 6/1999 | Hanai | 348/630 |
| 6,002,448 | A | * | 12/1999 | Hanai | 348/630 |
| 6,018,373 | A | * | 1/2000 | Hanai | 348/630 |
| 6,023,304 | A | * | 2/2000 | Hanai | 348/630 |
| 6,081,302 | A | * | 6/2000 | Hanai | 348/630 |

FOREIGN PATENT DOCUMENTS

| | | | | |
|---|---|---|---|---|
| JP | 6-014334 | * | 1/1994 | H04N/9/64 |
| JP | 7-095611 | * | 4/1995 | H04N/4/45 |

* cited by examiner

*Primary Examiner*—Matthew C. Bella
*Assistant Examiner*—Wesner Sajous
(74) *Attorney, Agent, or Firm*—RatnerPrestia

(57) ABSTRACT

Red color saturation is increased and red color with higher purity can be reproduced by composing: a red color detection circuit 1 for detecting a red color signal having higher purity by inputting color differential signals (R-Y) and (B-Y) modulated by color subcarrier, subtracting the absolute value of the (B-Y) signal from the positive polarity component of the (R-Y) signal and removing the negative part of the subtracted signal; Y signal compensation block including: first gain controller 50b for controlling the output signal amplitude of red color detection circuit 1 and a subtracter 50a for subtracting the output signal of first gain controller 50b from a luminance signal Y; an (R-Y) signal compensation block including: second gain controller 51b for controlling the output signal amplitude of red color detection circuit 1 and an adder 51a for adding the output signal of second gain controller 51b and the input (R-Y) signal; and a (B-Y) signal compensation block including: third gain controller 52b for controlling the output signal amplitude of red color detection circuit 1, a polarity inverter 52c for inverting the output signal polarity of third gain controller 52b, a switch circuit 52d for selecting either input signal or output signal of polarity inverter 52c, a polarity discriminator 52e for discriminating the polarity of the input (B-Y) signal and controlling switch circuit 52d and an adder 52e for adding the output signal of switch circuit 52d and the input (B-Y) signal.

11 Claims, 8 Drawing Sheets

PURE RED COLOR DETECTION CIRCUIT AND COLOR COMPENSATION CIRCUIT USING THE SAME

Matter enclosed in heavy brackets [ ] appears in the original patent but forms no part of this reissue specification; matter printed in italics indicates the additions made by reissue.

FIELD OF THE INVENTION

The present invention relates to a pure red color detection circuit and a color compensation circuit compensating color differential signals by using it and emphasizing the red color.

BACKGROUND OF THE INVENTION

Television receivers having a high additional value have been developed according to their increased screen sizes and high quality color television receivers having a good red color reproducibility are desired.

Block diagrams of a red color detection circuit and a color compensation circuit in accordance with the prior art disclosed in Japanese Patent Laid-Open No.5-233667 are shown in FIGS. 6 and 8, respectively. The function of a red color detection circuit is explained below, referring to FIGS. 6 and 7.

FIG. 6 shows a block diagram of a red color detection circuit 101 of the prior art and FIG. 7 shows signal waveforms at various points of red color detection circuit 101. Red color detection circuit 101 includes an absolute value outputting circuit 101b, a subtracter 101c and a limiter 101d. In FIG. 7, waveforms A and B are color differential signals (R-Y) and (B-Y), respectively which are input to red color detection circuit 101 and the color differential signal (R-Y) is behind the color differential signal (B-Y) by 90 degrees in phase. An absolute value B-Y is made from the input color differential signal (B-Y) at absolute value outputting circuit 101b and is output (waveform C) and is input to subtracter 101c. Subtracting the output of absolute value outputting circuit 101b B-Y (waveform C) from color differential signal (R-Y) (waveform A) at subtracter 101c (waveform D) and only a positive part is outputted from limiter 101d (waveform E).

Because this signal exists near the phase of 90 degrees, the detected output is a signal corresponding to a red color in the input chrominance signal.

The function of a color compensation circuit of the prior art is explained below, referring to FIG. 8. The color compensation circuit includes red color detection circuit 101, an amplitude control circuit 102 for a color differential signal (R-Y) and another amplitude control circuit 103 for a color differential signal (B-Y). A color differential signal (R-Y) and red color detected signal (waveform E) in FIG. 7 output from red color detection circuit 101 are supplied to amplitude control circuit 102 and the color differential signal (R-Y) is controlled by the red color detected signal so that the amplitude decreases. Also a color differential signal (B-Y) and the red color detected signal output from red color detection circuit 101 are supplied to amplitude control circuit 103 and also the color differential signal (B-Y) is controlled by the red color detected signal so that the amplitude decreases. Thus, suppressing a signal having a large red component prevents red color from saturation.

This circuit, however, aims to prevent red color saturation and a different kind of apparatus is necessary for improving red color reproducibility which is intended in the present invention. The present invention detects a signal closer to a pure red color in a red color detection circuit and decreases a Y/C ratio, emphasizes a red color without saturating the red color and as a result, improves red color reproducibility by decreasing the luminance signal Y by the red color detection signal and bringing a color phase of the chrominance signal C closer to a red color by the red color detection signal in the color compensation circuit.

SUMMARY OF THE INVENTION

A pure red color detection circuit of the present invention slices a subcarrier modulated color differential signal (R-Y) at a designated level at a slice circuit, generates an absolute value signal of a subcarrier modulated color differential signal (B-Y) at an absolute value outputting circuit, subtracts the absolute value B-Y from the sliced signal at a subtracter, takes out only a positive part of the subtracted signal at a limiter and outputs. The output signal is a signal having a narrow phase range near 90 degrees in the chrominance signal and as a result, a pure red color is detected.

A color compensation circuit of the present invention includes the above mentioned pure red color detection circuit, a Y signal compensation block, an (R-Y) signal compensation block and a (B-Y) signal compensation block and decreases a Y/C ratio, makes the chrominance signal containing a red color signal higher than a designated level close to a pure red color, emphasizes the red color without saturation and can improve red color reproducibility by outputting a luminance signal Y' which is made by subtracting the pure red signal detected at the pure red detection circuit from the input luminance signal Y, at the Y signal compensation block, outputting a color differential signal (R-Y)' which is made by adding the pure red signal detected at the pure red color detection circuit to the input (R-Y) signal, at the (R-Y) signal compensation block and outputting a color differential signal (B-Y)' which is made by subtracting the pure red signal detected at the pure red detection circuit from the input color differential signal (B-Y), at the (B-Y) signal compensation block.

BRIEF DESCRIPTION OF THE DRAWINGS

FIG. 4 shows color phase coordinates explaining how to rotate a vector of a chrominance signal close to an (R-Y) axis at a color compensation circuit in accordance with an exemplary embodiment of the present invention.

PREFERRED EMBODIMENTS OF THE INVENTION (First exemplary embodiment)

Figure 1:
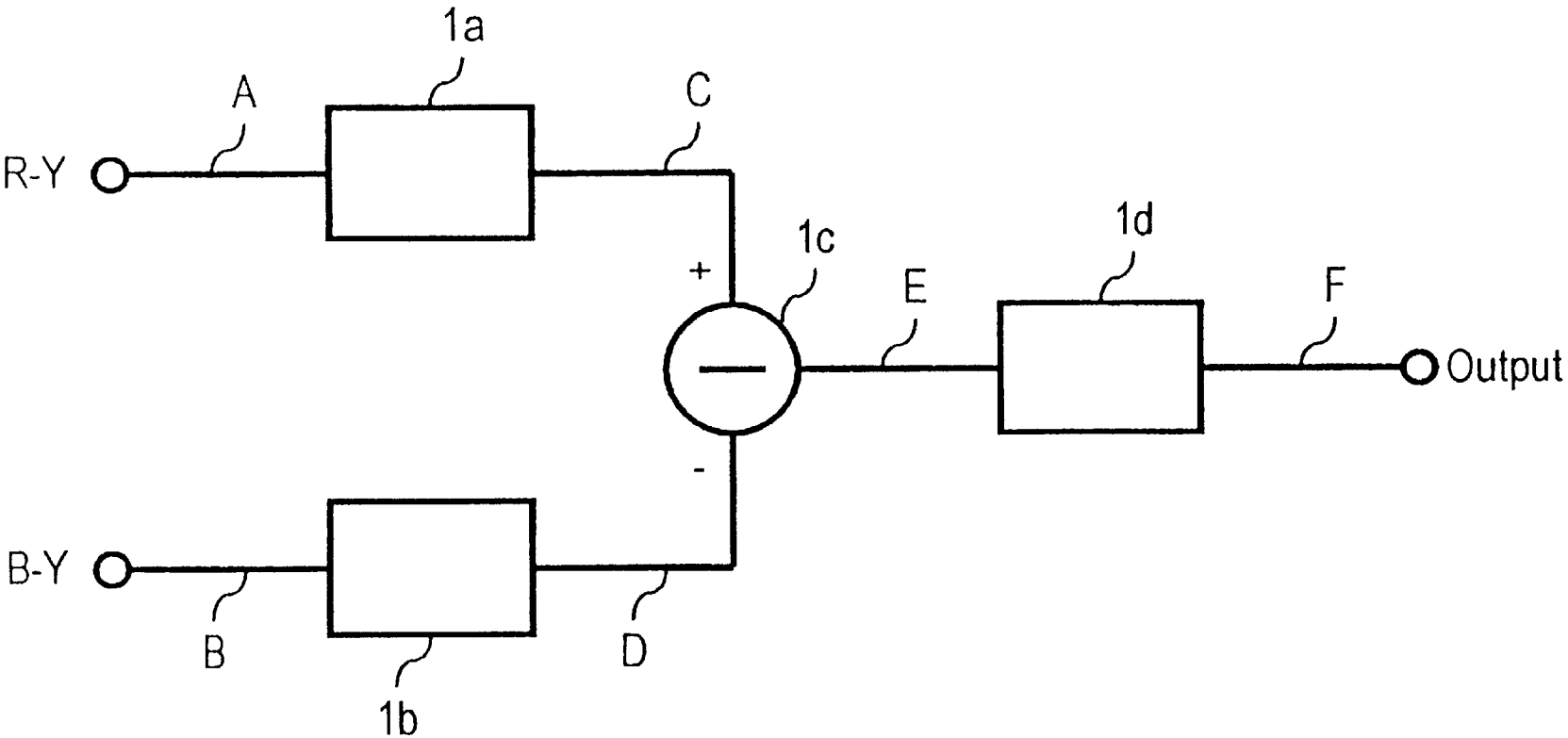
FIG. 1 is a block diagram of a pure red color detection circuit in accordance with an exemplary embodiment of the present invention.
Figure 2:
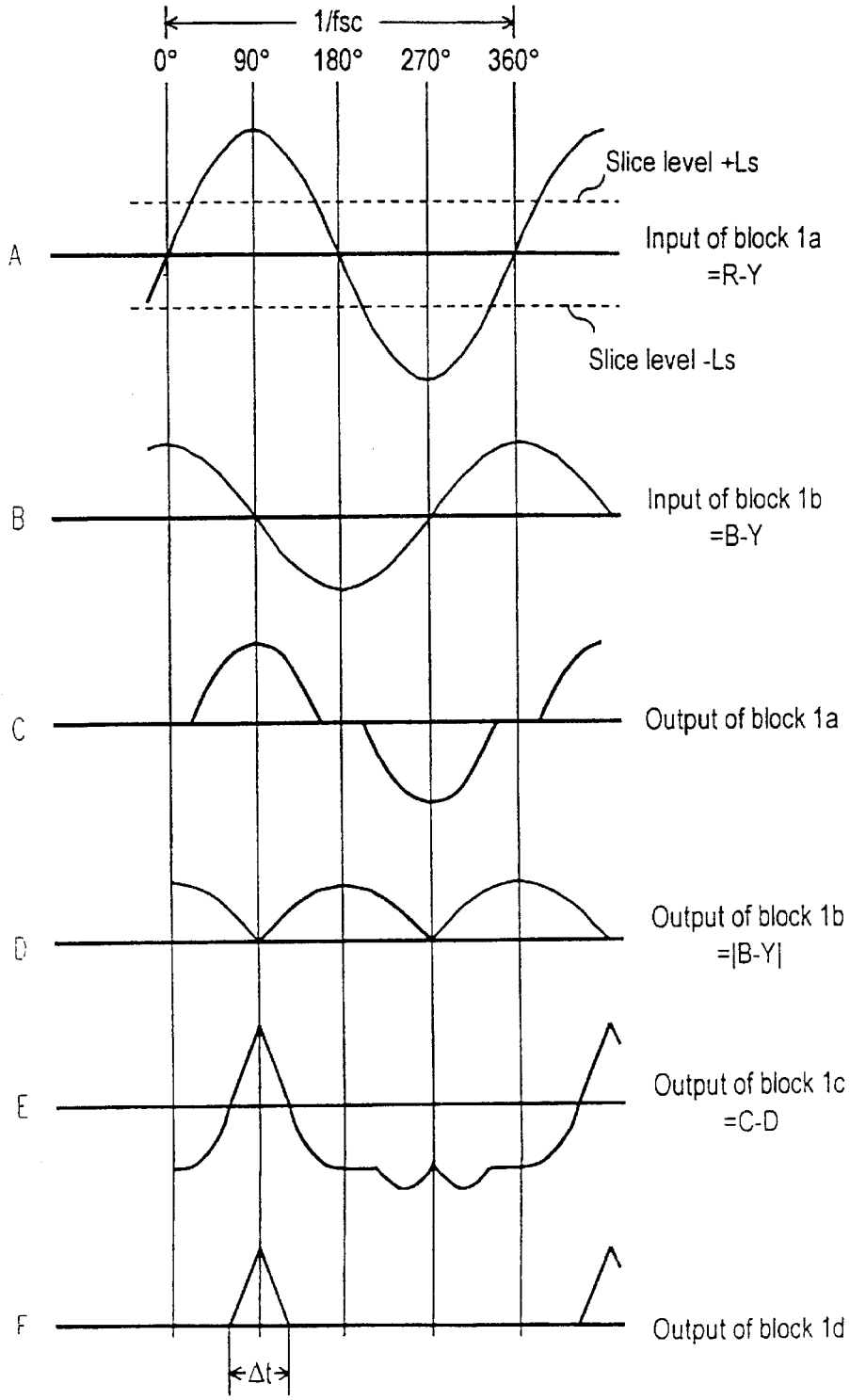
FIG. 2 shows waveforms at various points in a pure red color detection circuit in accordance with an exemplary embodiment of the present invention.
Figure 7:
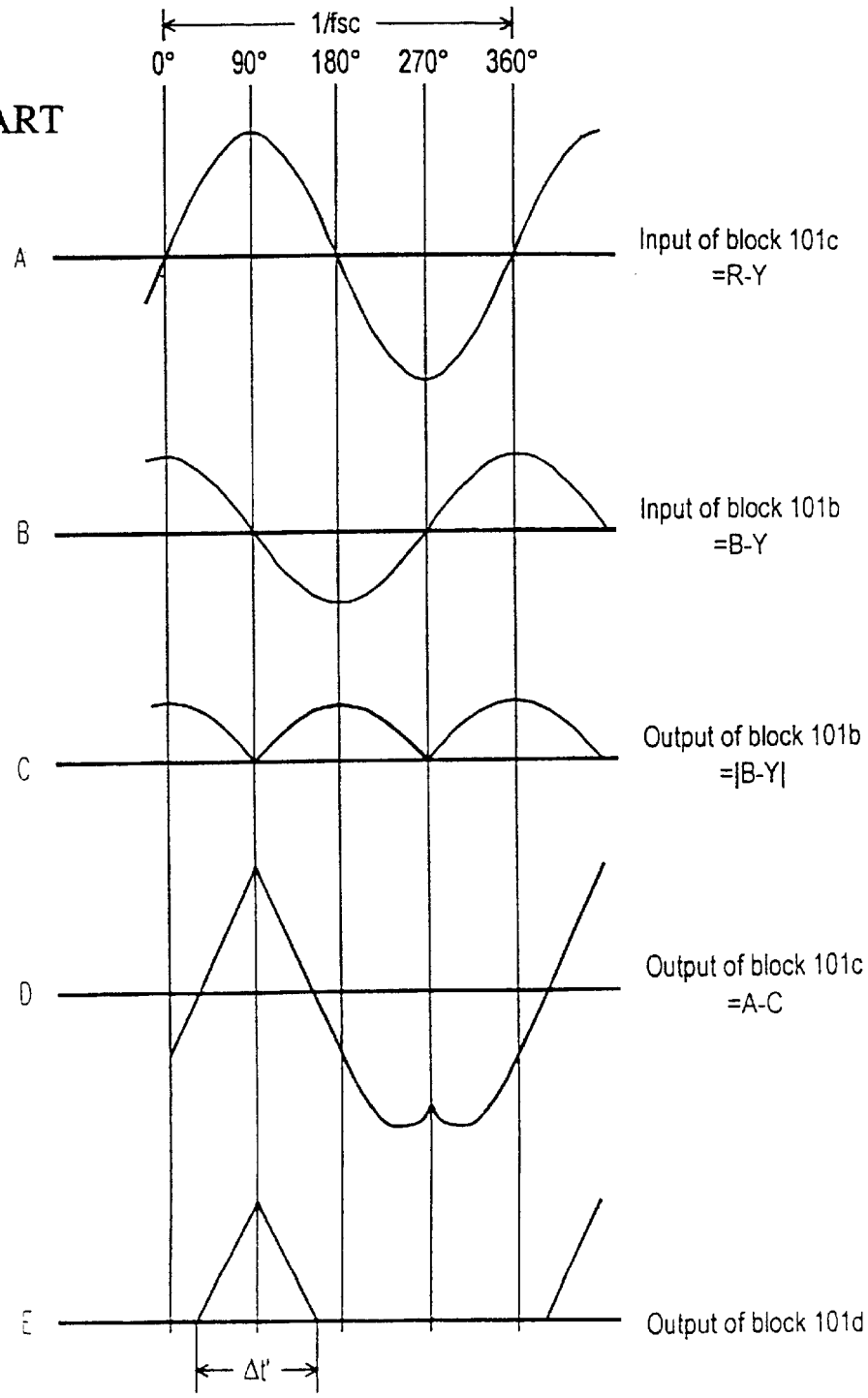
FIG. 7 PRIOR ART
FIG. 7 shows waveforms at various points in a red color detection circuit in accordance with the prior art.
Figure 8:
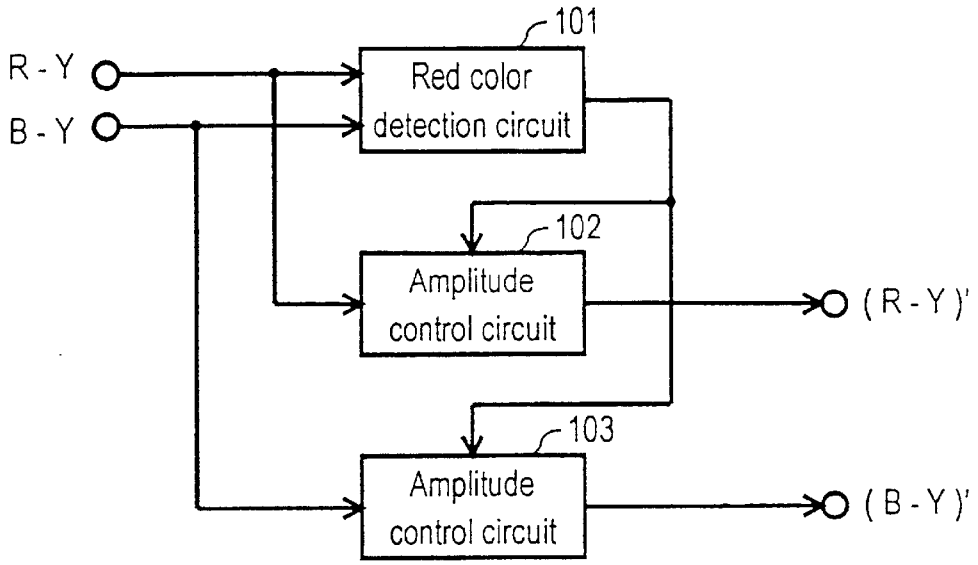
FIG. 8 PRIOR ART
FIG. 8 is a block diagram of a color compensation circuit in accordance with the prior art.

The function of a pure red color detection circuit is explained below, referring to FIGS. 1 and 2. All the signals treated in the exemplary embodiments are digital data. A block diagram of a pure red color detection circuit of the present invention is shown in FIG. 1 and waveforms at various points in the pure red color detection circuit are expressed by analog signals as shown in FIG. 2. The pure red color detection circuit 1 includes a slice circuit 1a, an absolute value outputting circuit 1b, a subtracter 1c and a limiter 1d. In FIG. 2, waveforms A and B are color differential signals (R-Y) and (B-Y) supplied to the pure red detection circuit, respectively and the color differential signal (R-Y) is delayed from the color differential signal (B-Y) by 90 degrees in phase. The color differential signal (R-Y) is sliced at sliced levels +/−Ls at slice circuit 1a and a signal over the slice levels is output (waveform C in FIG. 2) and is supplied to a subtracter 1c. An absolute value B-Y is generated from the color differential signal (B-Y) at absolute value outputting circuit 1b (waveform D) and is supplied to subtracter 1c. The output of absolute value outputting circuit 1b (waveform D) is subtracted from the output of slice circuit 1a (waveform C) at subtracter 1c (waveform E) and only a positive part of the subtracted signal it output from limiter 1d (waveform F). The detected signal is narrower in width in the present invention than that of the prior art because of being added with a slice circuit (t indicated in waveform F, FIG. 2 of the present invention compared with t' indicated in waveform F, FIG. 7 of the prior art), and a signal concentrated near 90 degrees, expressing by a color phase, that is close to the (R-Y) axis is detected. As a result, a signal close to a pure red color contained in the input chrominance signal is detected.

Thus, according to the present invention, a purer red color can be detected by outputting a red color detection signal only from a chrominance signal including a red color signal higher than a designated slice level.

(Second exemplary embodiment)

Figure 3:
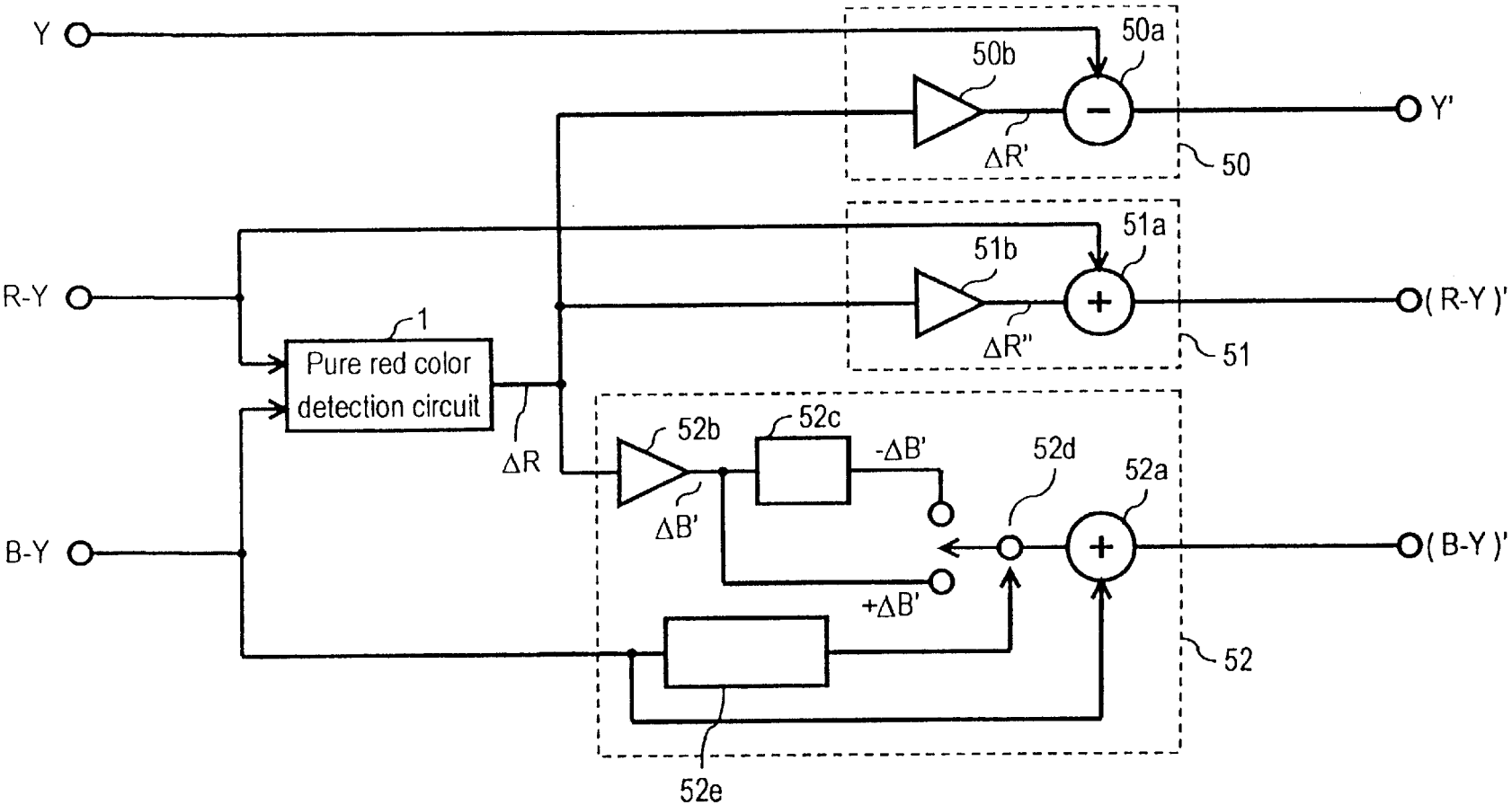
FIG. 3 is a block diagram of a color compensation circuit in accordance with an exemplary embodiment of the present invention.

The function of a color compensation circuit of the present invention is explained below, referring to a block diagram shown in FIG. 3. The color compensation circuit includes a pure red color detection circuit 1, a Y signal compensation block 50, an (R-Y) signal compensation block 51 and a (B-Y) signal compensation block 52. Y signal compensation block 50 includes a subtracter 50a and a gain controller 50b. (R-Y) signal compensation block 51 includes an adder 51a and a gain controller 51b. (B-Y) signal compensation block 52 includes an adder 52a, a gain controller 52b, a polarity inverter 52c, signal selection circuit 52d and a polarity discriminater 52e. Pure red color detection circuit 1 are supplied with color differential signals (R-Y) and (B-Y) and outputs a pure red detection signal R. The pure red color detection signal R is supplied to Y signal compensation block 50 and (R-Y) signal compensation block 51.

Pure red color detection signal R supplied to Y signal compensation block 50 is gain-controlled at gain controller 50c and is supplied to subtracter 50a. Subtracter 50a subtracts the gain-controlled pure red color detected signal R' from the luminance signal Y and outputs the result. The output signal is a luminance signal Y', the luminance of which corresponding to the pure red color part is somewhat suppressed.

Figure 4A:
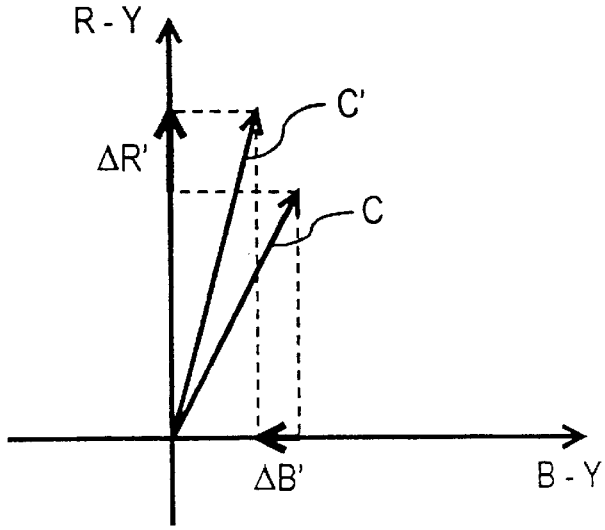
FIG. 4A shows color phase coordinates when the vector of a chrominance signal C is in a first quadrant.
Figure 4B:
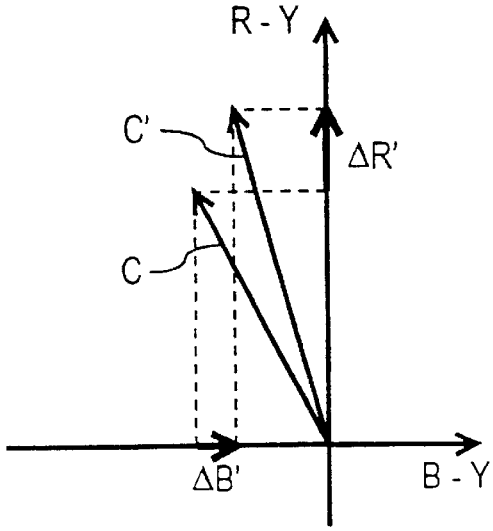
FIG. 4B shows color phase coordinates when the vector of a chrominance signal C is in a second quadrant.

Pure red color detection signal R supplied to (R-Y) signal compensation block 51 is gain-controlled at gain controller 51c and is supplied to adder 51a. Adder 51a adds the gain-controlled pure red color detected signal R' to the color differential signal (R-Y) and outputs the result. As shown in FIG. 4, adder 51a outputs a red color differential signal (R-Y)' with an increased amplitude, when the chrominance signal C is in a first quadrant (FIG. 4A) or in a second quadrant (FIG. 4B).

The output R of pure red color detection circuit 1 and the color differential signal (B-Y) are supplied to (B-Y) signal compensation block 52. The output R of the pure red color detection circuit 1 is gain-controlled in gain controller 52b (B') and its polarity is inverted by polarity inverter 52c (−B'). Both signals before and after polarity inversion are supplied to a signal selection circuit 52d. The other input color differential signal (B-Y) of (B-Y) signal compensation block 52 is discriminated its polarity by polarity discriminater 52e and switches the connection in signal selection circuit 52d. Signal selection circuit 52d is controlled to select the output of polarity inverter 52c (connect to the upper terminal of the switch in FIG. 3) when polarity discriminater 52e judges that the input color differential signal (B-Y) is positive and to select the input of polarity inverter 52c (connect to the lower terminal of the switch in FIG. 3) when polarity discriminater 52e judges that the input (B-Y) signal is negative. Adder 52a adds the positive or negative pure red color detected signal (B' or −B') of signal selection circuit 52d to the input color differential signal (B-Y) and outputs the added signal. As shown in FIG. 4, when the chrominance signal C is in a first quadrant (FIG. 4A), in other words the color differential (B-Y) signal is positive, signal selection circuit 52d selects the output of polarity inverter 52c and (B-Y) signal compensation block 52 outputs the value corresponding to {(B-Y)−B'}. As a result, the amplitude of the (B-Y) signal decreases. When the chrominance signal C is in a second quadrant (FIG. 4B), in other words the color differential signal (B-Y) is negative, signal selection circuit 52d selects the input of polarity inverter 52c and (B-Y) signal compensation block 52 outputs the value corresponding to −{(B-Y)−B'}. As a result the amplitude of the (B-Y) signal also decreases.

As shown in FIG. 4, when the chrominance signal is in a first quadrant or in a second quadrant, the synthesized chrominance signal C' rotates to be close to the (R-Y) axis in phase, because the (R-Y) component increases and (B-Y) component decreases by using the pure red color detected signal. The Y/C ratio is decreased, because the level of the luminance signal Y is lowered by the pure red color detected signal for a red part. By lowering the luminance level for a red part and rotating, the phase of a color close to red towards the (R-Y) axis is realized. As a result, yellowish color included in red is eliminated and a red color with high purity is reproduced.

Figure 5:
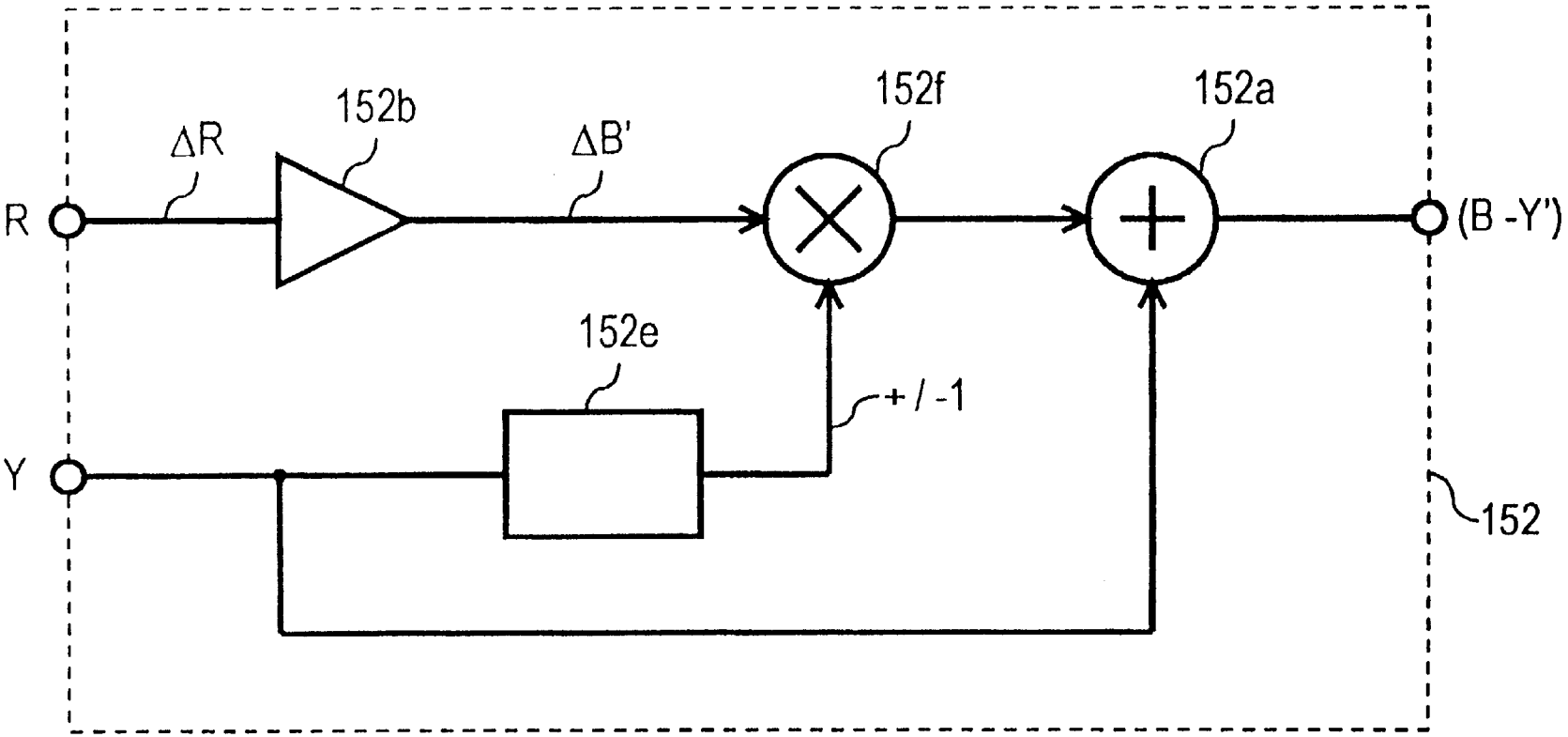
FIG. 5 is another block diagram of a (B-Y) signal compensating block of a color compensation circuit in accordance with an exemplary embodiment of the present invention.
Figure 6:
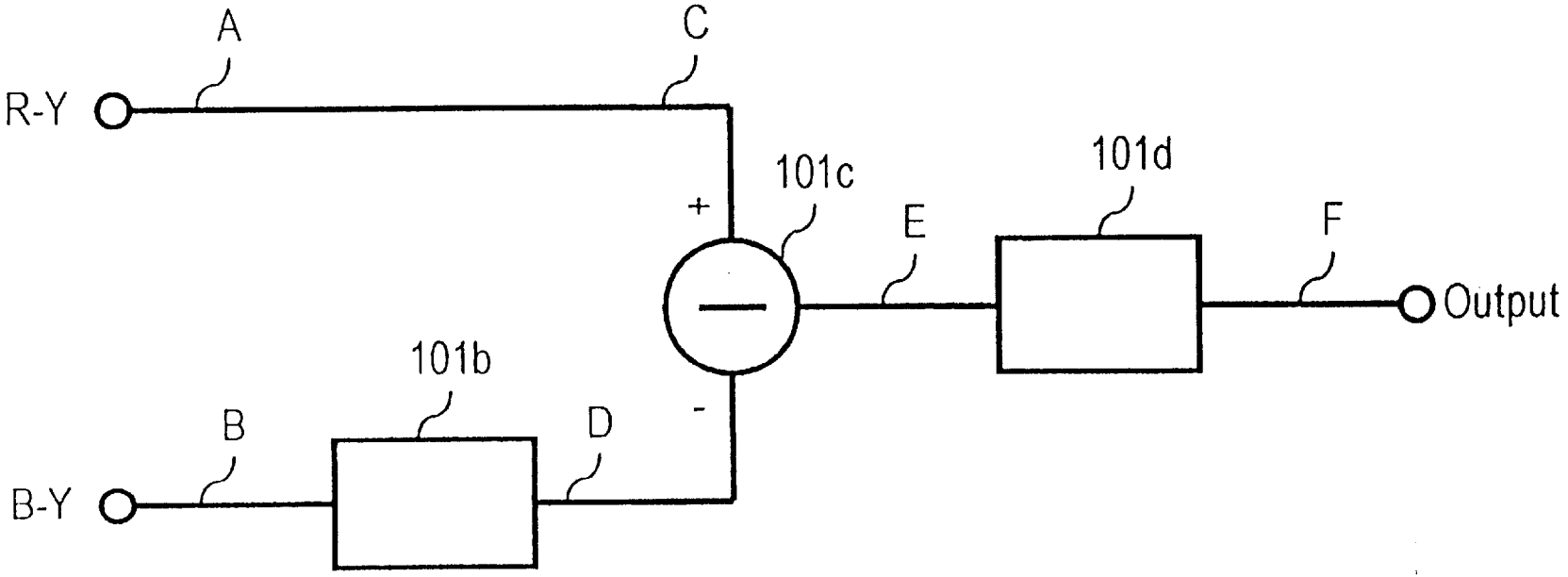
FIG. 6 PRIOR ART
FIG. 6 is a block diagram of a red color detection circuit in accordance with the prior art.

A block diagram of another composition of a (B-Y) signal compensation block included in a color compensation circuit is shown in FIG. 5. The (B-Y) signal compensation block 152 includes an adder 152a, a gain controller 152b, a multiplier 152f and a polarity discriminator 152e.

The output R of pure red color detection circuit 1 and a (B-Y) signal are inputted to (B-Y) signal compensation block 152. The output of pure red color detection circuit 1 R is gain-controlled in gain controller 152b (B') and is supplied to multiplier 152f. On the other hand, the (B-Y) signal is discriminated its polarity in polarity discriminater 152e and if the (B-Y) signal is positive, a signal corresponding to −1 is outputted and if it is negative, a signal corresponding to +1 is outputted. The signals are supplied to multiplier 152f. The output B' of gain controller 152b is multiplied by the output of polarity discriminater 152e, i.e. the value corresponding to 1 in multiplier 152f and the multiplied output is supplied to adder 152a. Therefore, multiplier 152f works as a combination of a polarity inverter (52c in FIG. 3) and a signal selection circuit (52d in FIG. 3). Adder 152a adds the output of multiplier 152f to the other input (B-Y). Because multiplier 152f works as a combination of a polarity inverter (52c in FIG. 3) and a signal selection circuit (52d in FIG. 3), the (B-Y) signal compensation block 152 also has the same function as the above mentioned (B-Y) signal compensation block 52.

In the color phase coordinates shown in FIG. 4, if the chrominance signal is in a first quadrant (FIG. 4A), multiplier 152f outputs the value corresponding to −B' and (B-Y) signal compensation block 152 outputs the value corresponding to {(B-Y)−B'} so that the amplitude decreases. If the chrominance signal C is in a second quadrant (FIG. 4B), multiplier 152f outputs the value corresponding to +B' and (B-Y) signal compensation block 152 outputs the value corresponding to −{(B-Y)−B'} so that the amplitude also decreases.

INDUSTRIAL APPLICABILITY

Thus, according to the present invention, in the pure red color detection circuit, a pure red color signal can be detected by slicing a color differential signal (R-Y) at a designated slice level, subtracting an absolute value of the color differential signal (B-Y) from the sliced (R-Y) signal and taking out only the positive part of the subtracted signal.

In a color compensation circuit using the pure red color detection circuit, the chrominance signal C can be rotated closer to the (R-Y) axis. This improvement is performed by decreasing the level of the high saturated red part and decreasing a Y/C ratio for a luminance signal Y, and adding the pure red detection signal and increasing the amplitude for the color differential signal (R-Y) and decreasing the amplitude by the pure red detection signal for the color differential signal (B-Y).

In a color television receiver using the above mentioned circuit, saturation is prevented for a strong red part, yellowish color contained in red is eliminated, highly pure red is reproduced and a picture with excellent color reproducibility can be obtained.

REFERENCE NUMERALS

1 . . . red color detection circuit
1a . . . slice circuit
1b . . . absolute value outputting circuit
1c . . . subtracter
1d . . . limiter
50 . . . Y signal compensation block
51 . . . (R-Y) signal compensation block
52 . . . (B-Y) signal compensation block
50a . . . subtracter
51a, 52a, 152a . . . adder
50b, 51b, 52b . . . gain controller
52c . . . polarity inverter
52d . . . signal selection circuit
52e, 152e . . . polarity discrimination circuit
52f, 152f . . . multiplier

What is claimed is:

1. A pure red color detection circuit comprising:

*a* slice [means] *circuit* for [inputting] *receiving* a color demodulated color-difference signal (R-Y) and for [extracting] *outputting* an (R-Y) signal component at a slice level (Ls);

absolute value means for inputting a color demodulated color-difference signal (B-Y) and for outputting an absolute value component of said [inputted] color-difference signal (B-Y);

subtraction means for subtracting the absolute value component of the (B-Y) signal [output from said absolute value means], from the (R-Y) signal *sliced* at said slice level (Ls) [and output from said slice means]; and

[limited means] *a limiter* for removing a negative component of [the] *a* signal output from said subtraction means and for outputting a red color component having an (R-Y) signal component in *a* first [and] *or a* second quadrant[s] *in a Cartesian plane*.

2. A color compensation circuit comprising:

red color detection means for detecting a red component, using color difference signals (R-Y) and (B-Y); and Y signal compensation means [for compensating a Y signal, using the] *which receives an* output signal of said red color detection means; [and] wherein said Y signal compensation means comprises:

[first] gain control means for decreasing [the] *an* output signal amplitude of said red color detection means; and

[second] subtraction means for subtracting [the] *an* output signal of said [first] gain control means from the Y signal.

3. A color compensation circuit comprising:

red color detection means for detecting a red component, using color difference signals (R-Y) and (B-Y); and (R-Y) signal compensation means for compensating said (R-Y) signal, [using the] *which receives an* output signal of said red color detection means; [and] wherein said (R-Y) signal compensation means comprises:

[second] gain control means for controlling [the] *an* output signal amplitude of said red color detection means; and

[first] addition means for adding said (R-Y) signal and [the] *an* output signal of said [second] gain control means.

4. A color compensation circuit comprising:

pure red color detection means for [inputting] *receiving* color demodulated (R-Y) and (B-Y) [signal] *signals* and detecting a red color from the (R-Y) and (B-Y) signals;

gain control means for controlling gain of a red [detecting] *detection* signal detected [as] *at* said pure red color detection means and outputted from said pure red color detection means; and addition means [inputting] *for receiving* an output signal from said gain control means and the (B-Y) signal, and outputting a compensated (B-Y) signal as a (B-Y)' signal.

5. A color compensation circuit comprising:

pure red color detection means for [inputting] *receiving* color demodulated (R-Y) and (B-Y) signals and for detecting a red color from the (R-Y) and (B-Y) signals;

first and second gain control means for controlling gain of a red [detecting] *detection* signal detected at said pure red color detection means and outputted from said pure red color detection means;

first addition means for [inputting the] *receiving an* output signal from [said first] *a third* gain control means and the (B-Y) signal, and for outputting a compensated (B-Y) signal as a (B-Y)' signal; and second addition means for [inputting the] *receiving an* output signal from said second gain control means and the (R-Y) signal, and for outputting a compensated (R-Y) signal as a (R-Y)' signal.

6. A color compensation circuit comprising:

pure red color [detecting] *detection* means for detecting a red color component, using color-difference signals (R-Y) and (B-Y);

first, second and third gain control means for independently controlling gain of a signal detected at said pure red color detection means;

[second] *first* subtraction means for [inputting the] *receiving a* signal output from said first gain control means and a Y signal, and for subtracting the signal output from said [second] first gain control means from said Y signal;

first addition means [inputting the] *for receiving a* signal output from said second gain control means and the (R-Y) signal; [and]

second addition means [inputting the] *for receiving a* signal output from said third gain control means and the (B-Y) signal; [and] *wherein* said pure red color detection means includes:

slice means for [inputting] *receiving* a color demodulated color-difference signal (R-Y) and for [extracting] *outputting* an (R-Y) signal component at a slice level;

absolute value means for inputting a color demodulated color-difference signal (B-Y) and for outputting an absolute value component of said [inputted] color-difference signal (B-Y);

[first] *second* subtraction means for subtracting the absolute value component of the (B-Y) signal [output from said absolute value means,] from the (R-Y) signal at said slide level [and output from said slice means]; and limiter means for removing a negative component of [the] *a* signal output from said *second* subtraction means and for outputting a red color component having an (R-Y) signal component in first and second quadrants.

7. A color compensation circuit comprising:

red color detection means for detecting a red component, using color differential signals (R-Y) and (B-Y); and (B-Y) signal compensation means for decreasing an absolute value of said color differential signal (B-Y), using [the] *an* output signal of said red color detection means[,]; wherein said (B-Y) signal compensation means includes:

[third] gain control means for decreasing the amplitude of [the] *an* output signal of said red color detection means;

polarity discrimination means for judging an output signal polarity of said color difference signal (B-Y);

polarity inverting means for inverting [the output] *a* signal polarity of *an output signal from* said [third] gain control means;

signal selection means for outputting an output signal of said polarity inverting means if said color differential signal (B-Y) has a positive polarity and outputting an output signal of said [third] gain control means if said color difference signal (B-Y) has a negative polarity; and

[third] addition means for adding [the] *an* output signal of said signal selection means and said color difference signal (B-Y).

8. A color compensation circuit comprising:

red color detection means for detecting a red component, using color differential signals (R-Y) and (B-Y); and (B-Y) signal compensation means for decreasing an absolute value of said color differential signal (B-Y), using [the] *an* output signal of said red color detection means[,]; wherein said (B-Y) signal compensation means comprises:

[third] gain control means for decreasing [the] *an* amplitude of the output signal of said red color detection means;

polarity discrimination means for judging [the] *a* polarity of said color difference signal (B-Y) and outputting *a* +1 *if said color difference signal (B-Y) has a negative polarity* or *a* −1 [signal] *if said color difference signal (B-Y) has a positive polarity*;

multiplication means for multiplying [the] *an* output signal of said [third] gain control means by [the] *an* output signal of said polarity discrimination means; and

[third] addition means for adding [the] *an* output signal of said multiplication means and said (B-Y) signal.

9. A color compensation circuit as defined in claim 2, [further including a pure] *wherein said* red color detection [circuit which] *means* comprises:

slice means for slicing a color difference signal (R-Y) with a designated slice level and outputting *a sliced signal*;

absolute value means for outputting an absolute value of a color difference signal (B-Y);

[first] *second* subtraction means for subtracting [the] *an* output signal of said absolute value means from the [output] *sliced* signal of said slice means; and limiter means for removing a negative polarity part of [the] *an* output signal of said [first] *second* subtraction means.

10. A color compensation circuit as defined in claim 3, [further including a pure] *wherein said* red color detection [circuit which] *means* comprises:

slice means for slicing a color difference signal (R-Y) with a designated slice level and outputting *a sliced signal*;

absolute value means for outputting an absolute value of a color difference signal (B-Y);

[first] subtraction means for subtracting [the] *an* output signal of said absolute value means from the [output] *sliced* signal of said slice means; and limiter means for removing a negative polarity part of [the] *an* output signal of said [first] subtraction means.

11. A color compensation circuit as defined in claim 4, [further including a pure] *wherein said* red color detection [circuit which] *means* comprises:

slice means for slicing a color differential signal (R-Y) with a designated slice level and outputting *a sliced signal*;

absolute value means for outputting an absolute value of a color difference signal (B-Y);

[first] subtraction means for subtracting [the] *an* output signal of said absolute value means from the [output] *sliced* signal of said slice means; and limiter means for removing a negative polarity part of [the] *an* output signal of said [first] subtraction means.

* * * * *